March 9, 1926.

C. BORNMANN 1,576,302

PHOTOGRAPHIC SHUTTER

Filed May 15, 1924

INVENTOR
CARL BORNMANN
BY
ATTORNEY

Patented Mar. 9, 1926.

1,576,302

UNITED STATES PATENT OFFICE.

CARL BORNMANN, OF BINGHAMTON, NEW YORK, ASSIGNOR TO ANSCO PHOTOPRODUCTS, INC., OF BINGHAMTON, NEW YORK.

PHOTOGRAPHIC SHUTTER.

Application filed May 15, 1924. Serial No. 713,619.

*To all whom it may concern:*

Be it known that I, CARL BORNMANN, a citizen of the United States, and a resident of the city of Binghamton, county of Broome, and State of New York, have invented a new and useful Improvement in a Photographic Shutter, of which the following is a description, reference being had to the accompanying drawing, which forms a part of this application.

My invention relates to photography and particularly to that branch dealing with photographic shutters for cameras. It is a well known principle in this art that proper cooperation of diaphragm aperture and the speed or exposure period of the shutter is necessary to correct results. With photographic shutters of present day construction at least two operations are necessary to bring about this cooperation. One operation for adjusting the diaphragm to the proper aperture and another for setting the shutter speed to regulate the exposure period. The performance of these acts frequently results in a disastrous delay in preparing the camera for picture taking. Furthermore, it is common, particularly among amateurs, to forget or neglect entirely, possibly thru ignorance, to make the proper adjustments before using the camera.

The principle above mentioned refers to the established fact that when setting the shutter for "instantaneous" or "snapshot" pictures, the diaphragm aperture should be adjusted to afford a comparatively larger light opening than when the shutter mechanism is set for "time" exposure, and conversely when the shutter is set for the latter, the diaphragm should be adjusted to render a smaller aperture than for "instantaneous." This for the reason that greater depth and better definition can be obtained by the use of the smaller aperture. Obviously, however, when the speed or length of exposure is limited as when the shutter is set for "instantaneous" the aperture must be enlarged to admit sufficient light to produce the image on the sensitized material regardless of depth or definition.

The principal object of my invention is to construct a shutter wherein the diaphragm is automatically and simultaneously adjusted to the proper aperture upon the setting of the speed or exposure controlling element.

Another object is to incorporate into a shutter of the character described a novel diaphragm and adjusting means therefor which is positive in operation and extremely simple in construction.

A further object is to produce a shutter containing the above features without detracting from the conventional shape and ornamental appearance of the same.

More specifically it is my purpose to provide a shutter diaphragm of the swinging leaf type provided with relatively large and small apertures which are automatically swung into and out of position with respect to the lens, simultaneously with and upon the operation for setting of the speed controlling element, the small aperture being effective for "time" exposures and the large apertures for "instantaneous" exposures.

Other objects and advantages in details of construction and operation will be apparent as the description proceeds, reference being had to the accompanying drawing, wherein like reference numerals indicate like parts.

Figure 1:
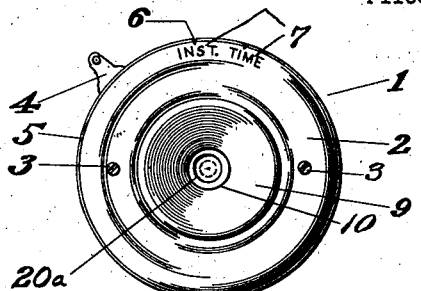
Figure 1 is a front view of my improved shutter the same being shown adjusted for instantaneous exposure and in dotted lines for time exposure.

I have indicated my improved shutter generally by the reference character 1 which as shown, includes a cover plate 2 secured to the body of the shutter as by screws 3, a trigger or operating member 4 and a controlling ring 5 which projects slightly beyond the periphery of the shutter body whereby said ring may be rotated. A V shaped notch or other indicator 6 is placed at one point in the periphery of the controlling ring 5 and cooperates with the speed indications 7 on the cover plate 2, in this instance indicating "instantaneous" and "time" exposures.

The body of the shutter is formed centrally thereof in front of the lens (not shown) with a protruding ring or bearing surface 8 over which the controlling ring 5 fits and upon which it rotates. The inner surface of the member 8 is screw threaded to receive a cap 9, the inside of which, is conical in shape terminating at the bottom in a comparatively large aperture 10. The outside of the cap 9 is screw threaded whereby the same may be secured in the member 8.

Figure 2:
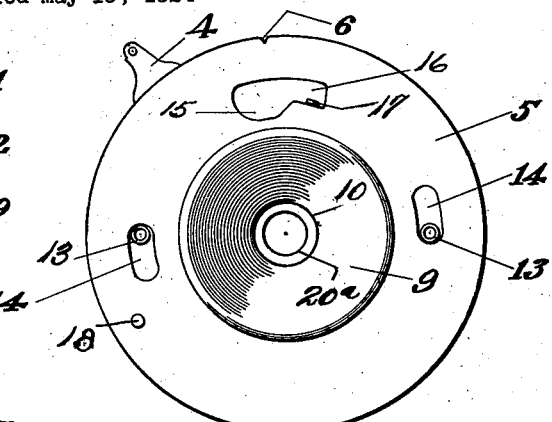
Figure 2 is an enlarged face view of the shutter the cover plate being removed showing the controlling ring and the lens cap in position. The parts are shown in this figure set for instantaneous exposure.

Upstanding posts 13 secured to the shutter body project thru slots 14 in the controlling ring 5 whereby the same is guided and limited in its movement. The controlling ring is also provided with a slot having an enlarged portion 15 and a comparatively narrow portion 16. Projecting into this slot is the end 17 of a lever which is connected to the shutter blade controlling mechanism of the shutter (not shown). This arrangement and construction is of a conventional type, old in the art and forms no part of this invention. Suffice it to say by way of explanation that when the controlling ring 5 is set for instantaneous exposure as shown in Fig. 2, the lever 17 is confined in the narrow portion 16 of the slot where it is unable to move downwardly and permit the well known locking action of the shutter blade mechanism resulting in time exposure. When, however, the controlling ring is moved to the position shown in Fig. 3 the lever 17 upon operation of the trigger member 4 is permitted to move downwardly into the enlarged part 15 of the slot where it performs such locking action for time exposure and thus necessitating a second operation of the trigger 4 to release the mechanism and close the shutter.

Figure 4:
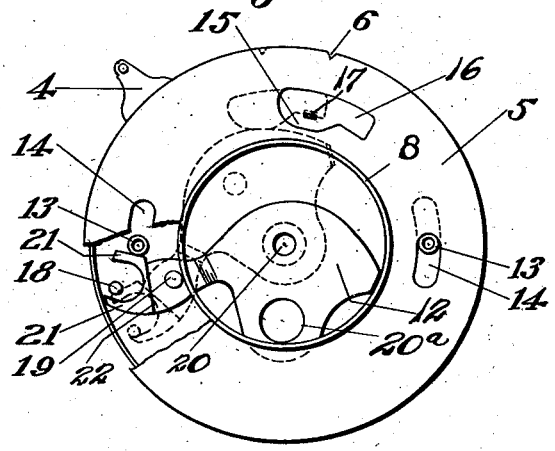
Figure 4 is a face view of the shutter with the cover plate and lens cap removed and with parts broken away for clearness in illustrating the operation of my improved diaphragm.

The controlling ring is provided with a pin 18 projecting downwardly from the surface of the ring for a purpose to be described. Pivoted at 19 beneath the controlling ring 5 is the diaphragm 12 comprising (as shown in Fig. 4) a thin leaf or sheet of metal having therein a relatively small opening 20, and a relatively large opening 20ª. One end of the diaphragm 12 is bifurcated as at 21, the two fingers or arms thereof extending on opposite sides of the pin 18 whereby upon rotation of the controlling ring 5 said pin will engage one of the arms 21 thus rocking the diaphragm 12 on its pivot bringing one of the openings 21 or 20ª into or out of lens covering position directly back of the cap 9. As will be understood this forms a ready means for changing the effective aperture of the lens and by virtue of the pin connection between the controlling ring and the diaphragm the action of said diaphragm is automatically controlled upon the manipulation of the controlling ring to set the shutter at its given speed or exposure controlling positions. As is obvious from Fig. 4 movement of the controlling ring to set the shutter for instantaneous exposure results in swinging the diaphragm 12 so as to place the large aperture 20ª in position as the effective aperture.

Figure 3:
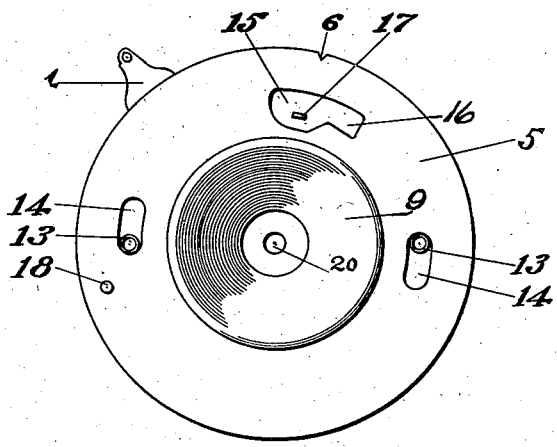
Figure 3 is identical with Fig. 2 except that the parts are shown in the position occupied when set for time exposure.
Figure 5:
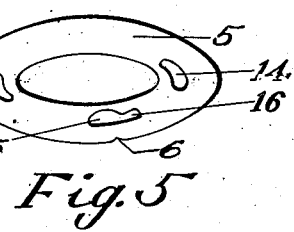
Figure 5 is a perspective view of the bottom or underside of the controlling ring.

When the controlling ring 5 is turned to position for time exposure the diaphragm 12 is simultaneously swung downwardly to bring the aperture 20 into position for governing the exposure as shown in Fig. 3. The bifurcated end 21 of the diaphragm 12 is shown in Fig. 4 as upstanding at 22 to insure engagement thereof with the pin 18.

It will be understood also, that my improved swinging diaphragm may be provided with a greater number of apertures, varying in size, thus adapting the same to shutters which are provided with a plurality of speed settings such as 1/25, 1/50 and 1/100 seconds.

The operation of the shutter is obvious from the foregoing description of its parts and need not, therefore, be again described in detail. It will be apparent to those skilled in the art that many variations in details of form and construction, some of which have been indicated, are possible without departing from the scope of my invention. I do not limit myself, therefore, to the form shown and described other than by the appended claims.

I claim:

1. A photographic shutter comprising a speed controlling element, a pivoted diaphragm provided with relatively large and small apertures, and means whereby operation of the speed controlling element results in swinging said apertures alternately into operative positions.

2. A photographic shutter including settings for "instantaneous" and "time" exposures, controlling means for said settings, a pivoted diaphragm provided with relatively large and small apertures, and means whereby operation of the controlling means to "instantaneous" or "time" settings will result respectively in rocking said apertures alternately into operative positions.

3. A photographic shutter including settings for "instantaneous" and "time" exposures, controlling means for said settings, a pivoted diaphragm provided with relatively large and small apertures, and means on said controlling means whereby operation of the controlling means to "instantaneous" or "time" settings will result respectively in rocking said diaphragm bringing said apertures alternately into operative positions.

4. A photographic shutter comprising speed controlling means, a pivoted diaphragm provided with relatively large and small apertures, and means on said controlling means for rocking said apertures alternately into and out of operative positions upon movement of said controlling means.

5. A photographic shutter comprising means for making "instantaneous" and "time" exposures, a controlling device for the same, a pivoted diaphragm provided with relatively large and small apertures, and a pin carried by said controlling means and cooperating with said diaphragm whereby the effective aperture of the lens is simultaneously enlarged when the shutter is set for "instantaneous" and reduced when the same is set for "time" exposures.

6. A photographic shutter comprising a speed controlling element including a rotatable ring provided with a pin, a diaphragm pivoted in said shutter and having relatively large and small apertures therein, and means on the opposite end of said diaphragm whereby said pin may engage with and rock said diaphragm on its pivot.

7. A photographic shutter comprising a speed controlling ring, a pin on said ring, a pivoted diaphragm provided with relatively large and small apertures, one end of said diaphragm being bifurcated to engage with said pin whereby movement of said speed controlling ring results in movement of said diaphragm.

8. A photographic shutter comprising a speed controlling ring, a pin on said ring, a pivoted diaphragm provided with relatively large and small apertures, one end of said diaphragm being offset and bifurcated to engage with said pin whereby movement of said speed controlling ring results in movement of said diaphragm.

9. A photographic shutter comprising a speed controlling ring, a diaphragm provided with relatively large and small apertures movable with said diaphragm alternately into operative position and means on said controlling ring for moving said diaphragm simultaneously with the operation of said controlling ring.

10. A photographic shutter comprising a speed controlling ring, a one piece diaphragm provided with relatively large and small apertures movable with said diaphragm alternately into operative position, and means on said controlling ring for moving said diaphragm simultaneously with the operation of said controlling ring.

11. A photographic shutter comprising a speed controlling ring, a one piece diaphragm provided with relatively large and small apertures movable with said diaphragm alternately into operative position, and means on said controlling ring for moving said diaphragm simultaneously with the operation of said controlling ring, and means including a pin carried by said ring and engaging with a part of said diaphragm.

12. A photographic shutter comprising a speed controlling element, a pivoted diaphragm provided with a plurality of apertures of different sizes, and means whereby operation of the speed controlling element results in swinging said diaphragm whereby the proper aperture is properly placed for each setting of said speed controlling element.

CARL BORNMANN.